United States Patent [19]

Swain

[11] 4,433,511
[45] Feb. 28, 1984

[54] MOBILE ABRASIVE BLASTING SURFACE TREATING APPARATUS

[76] Inventor: Jon M. Swain, 3114 Cedar Knoll, Kingwood, Tex. 77339

[21] Appl. No.: 264,297

[22] Filed: May 18, 1981

[51] Int. Cl.³ .......................... B24C 3/06; B24C 9/00
[52] U.S. Cl. ........................................ 51/424; 51/429
[58] Field of Search ................... 51/429, 423, 424, 425

[56] References Cited

U.S. PATENT DOCUMENTS

| | | | |
|---|---|---|---|
| 2,766,557 | 10/1956 | Pollard | 51/429 |
| 3,934,372 | 1/1976 | Diehn et al. | 51/429 |
| 3,934,373 | 1/1976 | Leliaert et al. | 51/425 |
| 3,981,104 | 9/1976 | Dreher | 51/429 |
| 4,020,596 | 5/1977 | Bergh | 51/429 |
| 4,052,820 | 10/1977 | Bergh | 51/423 |
| 4,222,205 | 9/1980 | Lake et al. | 51/425 |
| 4,319,436 | 3/1982 | Van Fossen | 51/429 |

FOREIGN PATENT DOCUMENTS

| | | | |
|---|---|---|---|
| 5604 | 11/1979 | European Pat. Off. | 51/425 |
| 2904093 | 8/1980 | Fed. Rep. of Germany | 51/425 |
| 1527333 | 10/1978 | United Kingdom | 51/429 |
| 1539571 | 1/1979 | United Kingdom | 51/425 |
| 1583410 | 1/1981 | United Kingdom | 51/424 |
| 2068795 | 8/1981 | United Kingdom . | |

Primary Examiner—Frederick R. Schmidt
Assistant Examiner—Robert A. Rose
Attorney, Agent, or Firm—Neal J. Mosely

[57] ABSTRACT

A mobile apparatus for treating surfaces by abrasive blasting consists of a mobile housing having self-propelled endless tracks or treads for moving over the surface to be treated. The housing has a reservoir for abrasive particles and a rotary wheel with blades operable on rotation to throw the abrasive particles against the surface to be treated to abrade or etch the surface. The rotary wheel is operable to throw the abrasive particles at a high velocity at an angle to the surface. A return passage for the particles has an opening at the angle of rebound of the particles extending toward the reservoir. A plurality of trays receives the recirculating particles, fill with particulate material and then spill into the reservoir. Particulate material on the trays absorbs kinetic energy from the particles to prevent further rebounding. The particles spill from the trays in a stream or sheet intersected by a stream of air removed overhead adjacent the trays which separates coarser particulate debris from the abrasive particles en route back to the reservoir. Dust collectors are provided which separate the dust from the air used in separating coarse debris from the abrasive and from the air supplied to assist in sweeping debris from beneath the apparatus. The housing is resiliently supported at one end to move over irregular surfaces without hanging up. A plurality of air passages direct air flow under the apparatus to sweep the surface to assist in removal of particulate.

21 Claims, 4 Drawing Figures

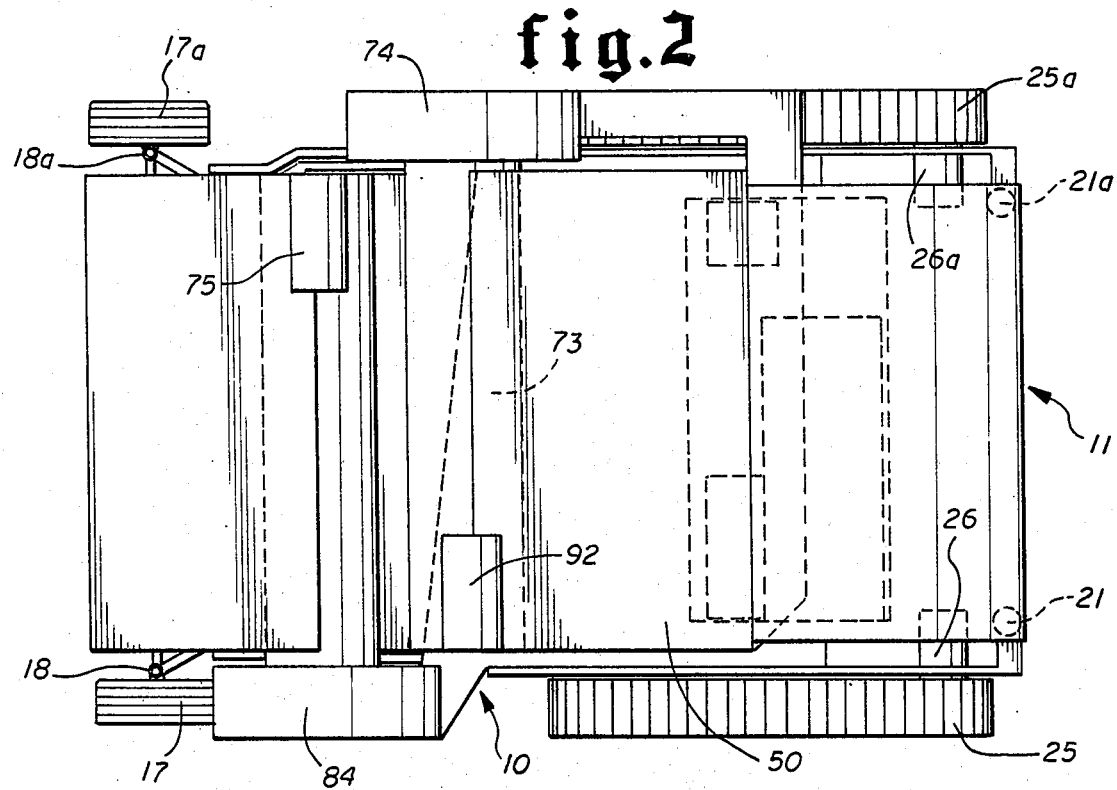
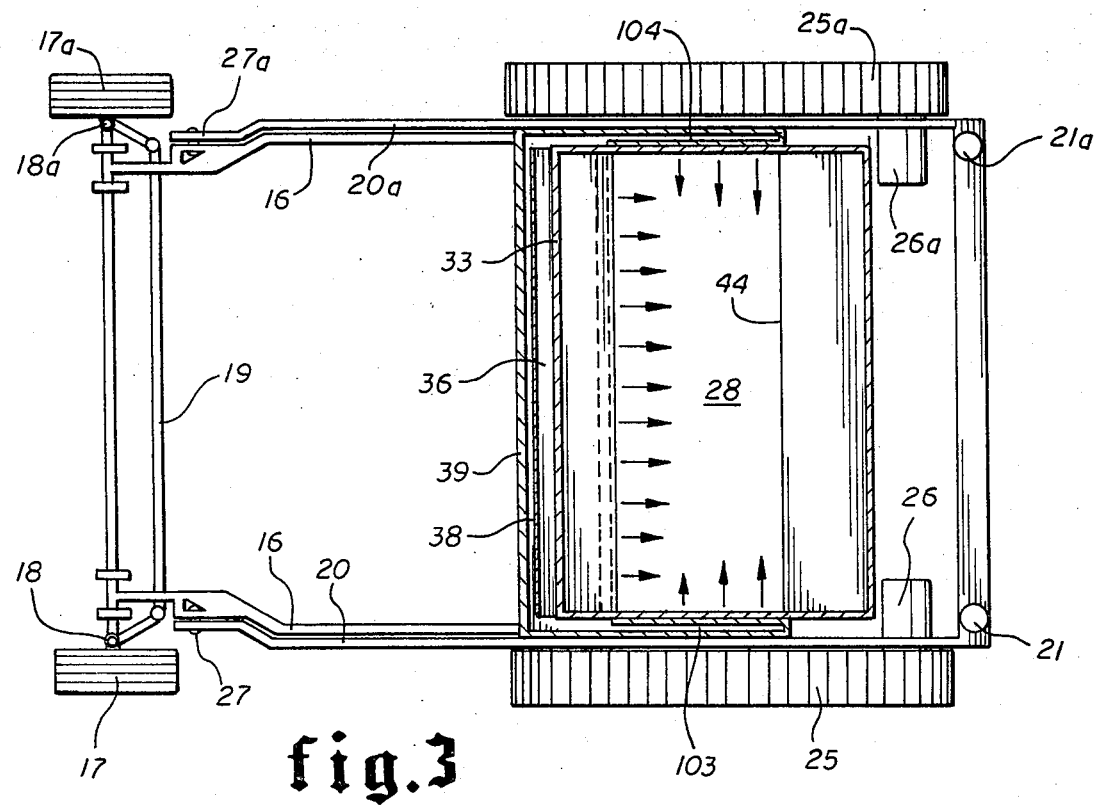

MOBILE ABRASIVE BLASTING SURFACE TREATING APPARATUS

BACKGROUND OF THE INVENTION

1. Field of the Invention

This invention relates to new and useful improvements in abrasive blasting apparatus for treatment of surfaces and more particularly to a mobile abrasive blasting apparatus for surface treatment.

2. Brief Description of the Prior Art

The prior art discloses a variety of machines for treating surfaces by impingement of particulate abrasive material. There are a large number of patents and other literature which are concerned with sand blasting devices and also shot blasting and other abrasive blasting apparatus.

Pawlson U.S. Pat. No. 3,034,262 discloses a resurfacing and finishing machine for use in treating surfaces of various shapes, whether horizontal or vertical, in which particulate abrasive material was introduced through an inlet at an angle and impinged against a surface at an angle by means of a throwing wheel and recovered and recirculated.

Mabille U.S. Pat. No. 3,380,196 discloses a mobile surface treating apparatus including a centrifugal impeller for impelling a concentrated stream of particulate material against the surface to be treated and includes means for collecting the particulate material after impingement on the surface.

Goff U.S. Pat. No. 3,691,689 discloses a mobile continuously operable abrasive surface cleaning apparatus which utilizes a rotating brush for recovery of the abrasive particles.

Leliaert U.S. Pat. No. 3,858,359 discloses a mobile apparatus for the surface treatment with particulate material thrown against the surface at high speed. The particulate material used is ferromagnetic and elements are provided for removal of the particulate material from the treated surface and a magnetic drum and conveyor for attracting the ferromagnetic material and conveying it for subsequent reuse.

Snyder U.S. Pat. No. 3,877,175 discloses a mobile apparatus for surface treatment with a particulate material thrown onto the surface at high speed. The apparatus is characterized by its use of a suction nozzle at the rear and a blower nozzle at the forward end of the apparatus to project a stream onto the surface for sweeping particulate material and waste in advance of the suction nozzle.

Goto U.S. Pat. No. 3,906,673 discloses a portable abrasive cleaning machine having a motor driven impeller for discharging an abrasive material against the surface to be treated. Air currents from a pressurized air source are employed to power the motor to feed the abrasive agent to the impeller to convey the abrasive agent particles back to the container and to separate the abrasive agent from the particles discharged into a bag filter.

Leliaert U.S. Pat. No. 3,934,373 discloses a portable apparatus for surface treatment with particulate material thrown against the surface at high velocity by a rotating wheel. The apparatus includes features for removing the particulate material and debris from the surface and particularly including a magnetic drum for attracting ferromagnetic material, a vacuum pack-up for removing nonmagnetic material an air jets for position and lifting the material to increase the efficiency of the recovery process.

Goff U.S. Pat. No. 3,977,128 discloses an improved abrasive throwing machine for projecting abrasive particles at an inclined angle relative to the surface to be treated and including rotary brushes for cleaning the surface and assisting in recovery of spent abrasive particles.

Shigyo U.S. Pat. No. 4,020,597 discloses a mobile floor cleaning and polishing apparatus which has a centrifugal projector for impelling abrasive particles against the surface and a magnetic drum for attracting and collecting the used particles and a vacuum suction system for recovering other particles.

Bergh U.S. Pat. No. 4,052,820 discloses a portable apparatus for treatment of surfaces having a centrifugal wheel for projecting abrasive particles onto the surface at an angle of 30° to 80° from the surface. A rebound corridor extending angularly upward and incorporating a paddle wheel carries the spent particles to a level above the hopper and the particles rebound and are collected in a reservoir and separated from particulate surface material.

Leliaert U.S. Pat. No. 4,080,760 discloses a portable or mobile surface treating apparatus having an abrasive particle throwing wheel and magnets for assisting in separating ferromagnetic particulate material. The nonmagnetic material is blown free and conveyed to a dust collector.

VanFossen U.S. Pat. No. 4,202,182 discloses an abrasive blast treating apparatus which is mobile and has a recovery system in which spent abrasive particles are separated from dust and dirt and collected in a reservoir and fed back to the abrasive throwing wheel.

The apparatus shown in the various prior art references cited is subject to a variety of problems. In many cases the apparatus is not sufficiently flexible for use in the treating of irregular surfaces. In other cases the separation of particulate abrasive from particulate debris removed from the surface is incomplete. In other cases there is a residue of particulate abrasive material left on the surface which is not recovered. Also, there is a tendency for the abrasive particles to rebound in the collection chambers and cause problems in separation and recovery.

SUMMARY OF THE INVENTION

It is one object of this invention to provide a new and improved apparatus for abrasive blasting of surfaces to be treated.

Another object of this invention is to provide an improved portable, self-propelled abrasive blasting surface treating apparatus.

Another object of this invention is to provide a new and improved apparatus for abrasive blasting having an arrangement for reducing the amount of rebounding of abrasive particles being recirculated therethrough.

Still another object of this invention is to provide a new and improved abrasive blasting apparatus including means for separating and collecting dust from the abrasive particles used in the apparatus.

Still another object of this invention is to provide an improved abrasive blasting surface treating apparatus which is self-propelled and has a floating blast head which moves longitudinally and vertically in a resilient manner over the surface to be treated.

Yet another object of this invention is to provide a new and improved abrasive blasting apparatus having an improved means for recovery of particulate abrasive and separation of particulate material removed from the surface treated.

Other objects of this invention will become apparent from time to time throughout the specification and claims as hereinafter related.

The above stated objects and other objects are accomplished by a mobile apparatus for treating surfaces by abrasive blasting. The apparatus consists of a mobile housing having self-propelled continuous treads for moving the same over the surface to be treated. A reservoir is provided for abrasive particles. A rotary wheel in the housing in communication with the reservoir has blades operable on rotation to throw the abrasive particles at a high velocity against the surface to be treated to erode the surface in the form of particulate debris. The rotary wheel is supported in the housing in a position such that the abrasive particles are thrown at a high velocity at an angle to the surface and the housing has a return passage having its opening positioned at an angle corresponding substantially to the angle of rebound of the abrasive particles from the surface and extending to convey the abrasive particles and particulate debris toward the reservoir.

At a point between the return passage and the reservoir there is provided an arrangement of trays which receive the abrasive particles and the particulate debris. The trays fill with the particulate material which spills into the reservoir. The particulate material thereon function to absorb the kinetic energy of the abrasive particles to prevent further rebounding. Air and particulate debris in the form of dust fine enough for complete entrainment with the air are removed vertically upward through a fine mesh screen. The abrasive particles and particulate debris spills from the trays into a tapered collection chamber in a stream or sheet of particles which is intersected by a cross flow of the air removed overhead and due to the abrasive particles having greater weight and density tends to separate the coarser particulate debris from the abrasive particles before the abrasive particles are returned to the reservoir. Dust collector(s) are provided to separate dust from the air removed overhead and from the air supplied underneath the apparatus to air-sweep debris from the surface being treated.

The apparatus preferably has a resilient support for the housing for moving irregular surfaces without hanging up or being unduly spaced from the surface. The mobile support is preferably a continuous tread support and provided with suitable motors for selective moving of the apparatus. The apparatus may also include air passages for introducing streams of air in sweeping relation to the surface being treated to assist in removal of particulate debris therefrom.

BRIEF DESCRIPTION OF THE DRAWINGS

FIG. 2 is a plan view of the apparatus seen from the line 2—2 of FIG. 1.

FIG. 3 is a sectional view of the apparatus taken on the line 3—3 of FIG. 1 and showing the passages for circulation of air underneath the machine.

DESCRIPTION OF THE PREFERRED EMBODIMENT

Figure 1:
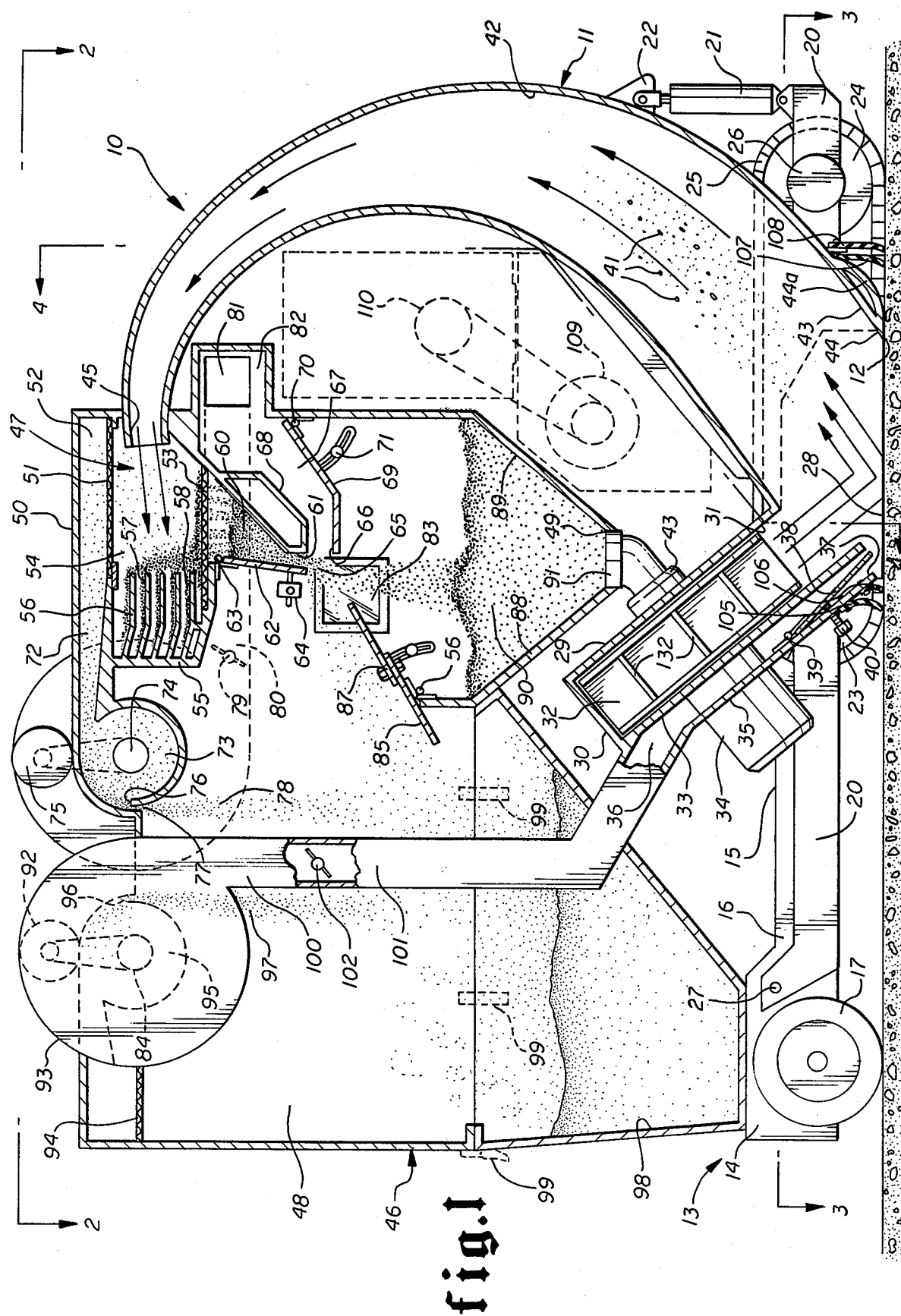
FIG. 1 is a view in vertical section illustrating the essential features of a preferred embodiment of a mobile self-propelled abrasive blasting surface treating apparatus.
Figure 4:
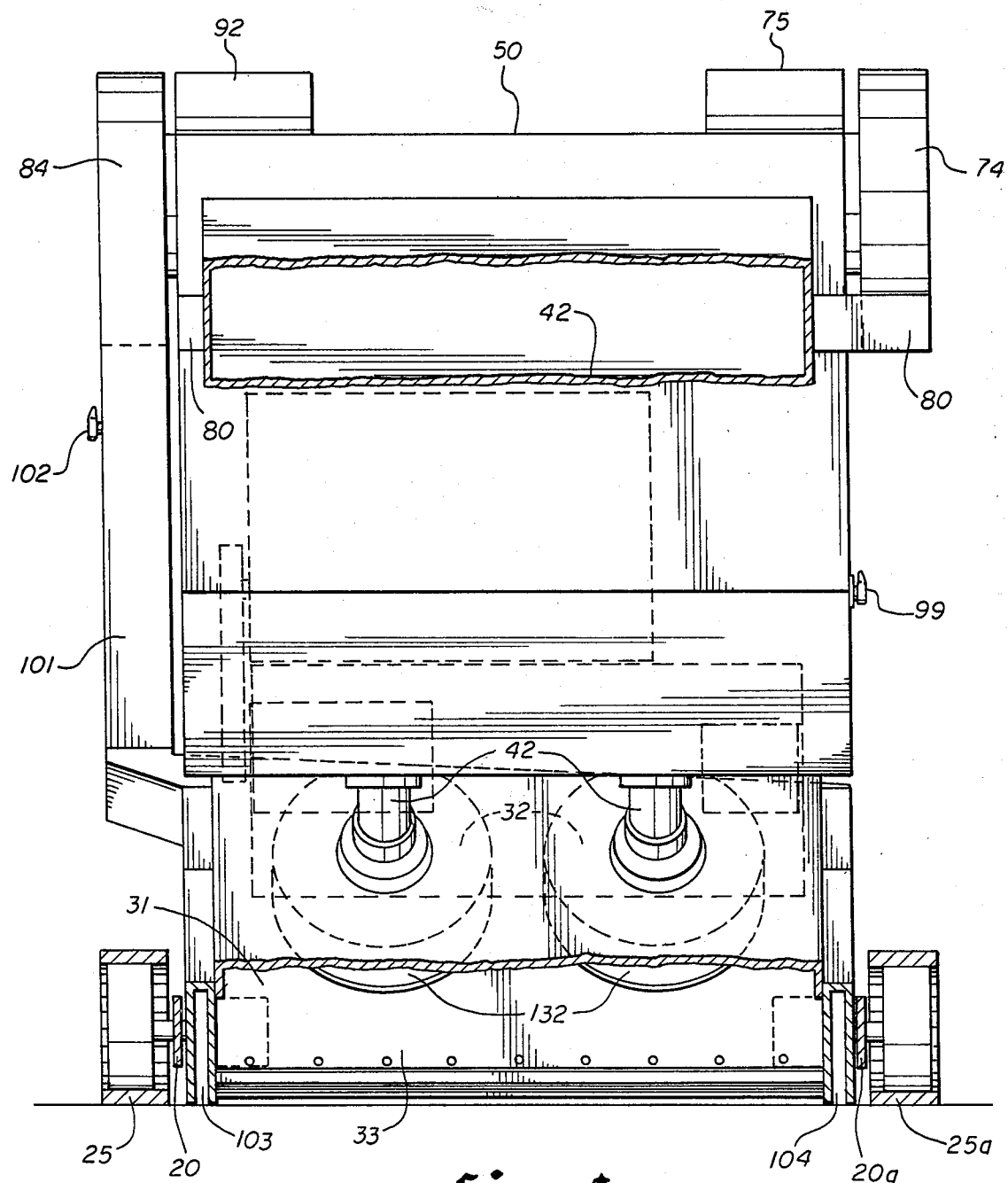
FIG. 4 is a sectional view of the apparatus taken on the line 4—4 of FIG. 1 and showing another view of the passages for circulating air underneath the machine.

Referring the drawings by numerals of reference, there is shown a mobile abrasive blasting surface treating apparatus 10 which is constructed and arranged for horizontal movement over a surface to be treated, such as concrete pavement, a painted steel deck, or the like. The equipment is primarily designed for the treatment of concrete surfaces such as highways, driveways, parking lots, etc. to clean and etch the surface in preparation for application of a protective coating or a new layer of concrete.

Apparatus 10 comprises a housing 11 having a bottom opening 12. Housing 11 is supported on a self-propelled mobile support 13 which is preferably a continuous or endless tread or track type of support driven by a suitable motor. Housing 11 is secured in a relatively fixed, rigid relation to one end 14 of framework 16 of mobile support 13. The other end 15 of framework 16 of support 13 also supports housing 11. Framework 16 has a pair of wheels 17 and 17a (FIG. 2) which have pivoted supports 18 and 18a for steering by a tie rod 19. A supporting framework 20 is connected by a suitable resilient supporting member 21 to a fixed bracket 22 on housing 11. Resilient supporting member 21 is preferably an air cylinder. The resilient connection could alternately be equivalent resilient means such as set screws with springs or a hydraulic cylinder with an accumulator.

Framework 20 supports drive wheel 23 at one end and wheel 24 at the other end around which there is positioned a continuous or endless drive tread 25. Wheels 23 and 24 which drive continuous treads 25 (there is another tread 25a and supporting wheels 22a and 23a behind the ones shown) are driven by suitable motor means preferably hydraulic motors 26 and 26a operated by the hydraulic system for the apparatus (not shown). The two sets of treads 25 and 25a can be operated forward or backward and controlled in speed so that the apparatus can be moved either forward or backward or turned partially or completely around by variation in the speed or direction of rotation of treads 24. The equipment can also be steered by steering wheel(s) 17 and 17a in the front or rear to control direction. Supporting framework 20 is pivotally connected as at 27 to framework 26 to provide an articulated support.

The resilient supporting means 21 which supports the forward end of housing 11 is operable to counterbalance the weight of the housing 11 so that it floats, by means of pivoted connection 27, with only enough weight to insure contact with the surface 28 to be treated and thus will ride over irregularities in the surface without hanging up. If desired, supporting means may be provided which will lift the housing completely during reverse or non-working travel.

Housing 11 has an angularly disposed portion 29 which is closed at one end 30 and has an opening 31 facing the surface 28 to be treated. A wheel 32 for throwing abrasive particles is supported on wall 33 of housing portion 29 for rotation by motor 34. Wheel 32 has a plurality of blades 132 for throwing abrasive particles. Abrasive throwing wheels of this type are well known in the art and many suitable designs for such wheels are shown in the prior art patents listed above. Motor 34, which is preferably a hydraulic motor operated by the hydraulic system for the apparatus, is supported on housing wall 35 which is spaced from wall 33 to provide an air passage 36. Housing portion 29 has wall 35 spaced from wall 33 and providing passage 36 in parallel with the chamber in which wheel 32 is positioned.

Passage 36 is connected to a suitable supply of air, as will subsequently be described, and has an outlet opening 37 through which air is ejected in parallel to the abrasive particles thrown by wheel 32 and assisting in air-washing or sweeping particulate debris from the surface 28 being treated by the abrasive particles. Passage 36 is controllable by adjustable damper 38 which is hinged therein at 39 and controlled by adjustment screw 40. The abrasive particles 41 are preferably hardened steel shot which has been stress relieved or annealed to make it less brittle.

Housing 11 has a return passage 42 with an opening 43 inclined relative to the surface 28 at about the rebound angle for the abrasive particles 41. The opening 43 to return passage 42 terminates in a sharp edge 44 which is the edge of opening 12 and slides smoothly on surface 28 to function as a dust pan collecting particulate matter or debris released from the surface 28 by the impingement of abrasive particles 41 thereon. Return passage 42 curves upward and tapers or narrows toward its exit end 45. The abrasive particles 41 and the fine and coarse particulate debris from surface 28 are carried up through return passage 42 and discharged through opening 45 into collection and separatory housing 46.

The housing 46 is divided vertically into an abrasive recovery section 47 and a dust separation and collection section 48. The housing abrasive recovery section 47 has a bottom opening 49 communicating with abrasive throwing wheel 32 and communicates to the side with collector section 48. Top wall 50 may be a moveable or hinged cover, if desired, for access and cleaning. Housing 46 includes apparatus for collecting spent abrasive 41 and fine and coarse particulate debris from surface 28 and separating the debris from the abrasive particles 41 prior to returning the same for continued circulation by blast wheel 32.

Housing 46 has a fine screen 51 extending across the top portion thereof and spaced below the top wall or cover 50 to define an upper chamber 52. Screen 51 extends from a point just above the outlet end 45 of return passage 42. A coarse screen 53 extends across the abrasive recovery section 47 of housing 46 below the outlet end 45 of return passage 42 and defines a chamber or cavity 54 between screens 51 and 53.

Upper screen 51 is of a size permitting withdrawal of air and fine dust circulating with the recirculating abrasive particles and particulate debris. The coarse screen 53 has openings of a size permitting the largest shot and particulate debris to pass through and assists in classifying the particulate matter from bolts, rocks, larger broken material, etc. which may have been picked up by the apparatus.

On the wall 55 of housing 46 opposite the outlet end 45 of return passage 42, there are provided a plurality of vertically spaced trays 56 which are disposed generally in a horizontal direction but inclined downward somewhat and having end portions 57 bent into a more nearly horizontal relation. The trays 56 are positioned in alignment with the flow of spent abrasive 41 and particulate debris from surface 28 ejected from the outlet end 45 of return passage 42.

Trays 56 collect a layer 58 of abrasive and debris thereon. The collected layer 58 of abrasive particles and particulate debris is loosely held on trays 56 and serves to absorb the kinetic energy of abrasive particles and particulate debris which impinge upon the collected layer of material. The collected layer 58 is loosely piled on trays 56 and the individual particles are free to move and absorb kinetic energy of the moving abrasive particles and particulate debris impinged thereon from the outlet opening 45 of return passage 42. This arrangement allows abrasive to wear on abrasive and virtually eliminates wear on the basic machine at this point. As the layers of particles build up on trays 56 the particles fall off the ends of the trays in a stream or narrow sheet and fall through the coarse openings in screen 53.

Below screen 53, housing section 47 has an inclined wall 59 defining a tapered collection chamber 60 having an opening 61 closed by a moveable gate or closure 62 hinged at 63 and provided with a counterweight 64 urging the same toward a closed position. The particulate matter from the tapered chamber 60, including spent abrasive 41 and particulate debris, build up enough weight to push the gate from its closed position and falls through opening 61 in a relatively narrow sheet as indicated at 65 past an opening 66 from passage 67 defined by wall member 68 and 69. Wall member 69 is hinged as at 70 and adjustable as 71 to vary the size of opening 66.

Upper chamber 52 has an outlet opening 72 open to cylindrical separator 73 operated by blower 74 driven by motor 75. Separator 73 has a peripheral skimmer opening 76. Dust particles are thrown centrifugally to the wall of the cylinder and discharge through skimmer opening 76 as indicated at 77 into the collection section 48 of the housing. Blower 74 has an outlet chamber 78 opening past damper 79 to conduit(s) 80 which connect to corresponding openings 81 at the inlet end portion 82 to passage 67.

This arrangement provides for the withdrawl of air and fine particulate debris from chamber 54, separates the dust therefrom, and injects a flow of that air through passage 67 crossing the downwardly falling mixture of abrasive particles and particulate debris 65. This cross flow of air is effective to separate substantially all of the particulate debris from the abrasive particles. The degree of separation accomplished can be accurately controlled. Housing 46 has a viewing window 83 for observing and making adjustments in the separation.

This circulation of air from passage 67 and separated debris continues into dust collector section 48 where the particulate material is separated. The particulate debris blasted loose, as a general rule, is much smaller in diameter and, in most cases, a less dense substance and therefore, particle for particle, much ligher than the abrasive particles used. When allowed to fall by gravity past an air cross current, the lighter particles deflect at a greater angle from the vertical than the heavier particles. This air flow is under the influence of a fan or blower 84 associated with the dust collector section 48.

Housing 46 has an adjustable skimmer plate 85 positioned against the opening 66 and extending diagonally toward the falling mixture of abrasive particles and particulate debris. The angle, elevation and degree of projection of skimmer plate 85 is adjustable by hinge 56 and sliding adjustment 87 to position the same in an optimum position for skimming off the particulate material being separated by the cross flow of air. The adjustable skimmer plate 85 is adjustably connected as indicated at hinge 56 and has an adjustable slotted connection as indicated at 87. The points of adjustment permit skimmer plate 85 to be adjusted longitudinally by extending the same or retracting it, and also angularly on hinge 56.

This arrangement of adjustable supporting features provides for the vertical, horizontal, pivotal and angular extension adjustment of skimmer plate 85 by hinge 86 and sliding adjustment 87. The velocity of the cross flow of air is adjustable by movement of wall 69 to adjust opening 66. By adjustment of skimmer plate 85 and of the velocity of the cross flow of air, it is possible to control accurately the separation of debris from the spent abrasive particles 41.

The extreme bottom of abrasive recovery section 47 comprises inclined bottom walls 88 and 89 which define a hopper chamber or compartment 90 which collects the spent abrasive particles which have been separated from the particulate debris. The bottom of hopper 90 is provided with an outlet opening 91 having an abrasive flow controlling valve (not shown) for metering the flow of abrasive particles. Metering can also be accomplished by suitable variable speed motor means.

The cross flow of air and particulate debris which passes skimmer plate 85, where the spent abrasive particles 41 are separated, continues into dust collector section 48. At the top of collector section 48, blower 84 is positioned to recirculate the air and separate the particulate matter therefrom. Blower 84 is operated by motor 92 and has an inlet 93 just above screen 94 which protects the blower against larger particles of debris.

Blower 84 provides the circulation of air and dust to cylindrical separator 95 which has a skimmer opening 96 in the side wall thereof. The dust particles in the air are thrown to the wall of the cylinder and emerge from skimmer opening 96 as a stream 97 of separated particles. The coarser debris in the air stream and the fine stream 97 of dust particles drop into the bottom or hopper portion 98 of collector section 48. The hopper portion 98 is a removable hopper which is secured to the upper portion of the collector section 48 by a plurality of latches 99.

The outlet 100 from blower 84 opens into the upper end of air conduit 101 which, in turn, is connected to air passage 36 adjacent to abrasive blast wheel 32. The flow of substantially dust-free air through the passages 101 and 36 is regulated by a manually controlled damper 102 and outlet control damper 38. As described above, the air flow through passage 36 enters the space under the apparatus at a high linear velocity to provide a sweeping or washing action to pick up particulate debris. This air flow is primarily for removing dust and larger particulate debris since the kinetic energy of the abrasive particles is more than adequate to cause them to recirculate through the apparatus as described. The apparatus has side passages 103 and 104 which communicate with passage 36 (FIG. 3) and receive air therefrom. The washing or sweeping action of the air flow underneath the apparatus is shown by the directional arrows in FIG. 3.

The space underneath the apparatus is enclosed on the sides by the tracks or treads 25 and 25a and by flexible rubber or plastic guards 105 and 106 at one end and guards 107 and 108 at the other end. These features provide an enclosure or seal for the area underneath the apparatus and tend to confine the abrasive particles to that area so that the loss of abrasive particles is minimal.

The apparatus is moved and operated by any suitable motor means which can be an electric motor, internal combustion motor, hydraulic motor, pneumatic motor, etc., or combinations thereof. In FIG. 1, the motor means is shown schematically as a hydraulic pump or motor 109 which is driven by electric motor or internal combustion motor 110 which may provide power for motors 26 and 26a for driving the tracks or treads 25 and 25a and may provide power for motors 75 and 92 which operate the blowers for air circulation and dust and debris separation and collection.

OPERATION

The operation of the equipment described above should be apparent from the description of the component parts and assembly thereof. Nevertheless, it will be advantageous to describe the operation more thoroughly with special emphasis upon the advantages of certain features over the prior art.

The apparatus shown and described is a mobile abrasive blasting surface treating apparatus which is self-propelled on continuous treads 25 and 25a by hydraulic motors 26 and 26a. These treads also provide a positive seal on the sides of the blast area where abrasive is most likely to escape. The frame for continuous treads 25 and 25a is articulated at pivots 27 and 27a and supports the housing 11 of the apparatus rigidly at one end and resiliently at the other end.

The forward end of the apparatus is supported resiliently by means of resilient supporting means 21, preferably a pneumatic cylinder connected to bracket 22 on housing 11 and to the end of supporting framework 20. The resilient supporting means 21 supports the forward end of the apparatus resiliently and counterbalances the weight thereof so that the apparatus does not bear heavily on the surface being treated, thus making it possible for the apparatus to move the housing over irregular surfaces insuring contact but without hanging up.

As previously noted, this apparatus is designed for applying an abrasive blasting treatment to hard surfaces for cleaning or for removing and roughening the surface layer in preparation for further treatment. The apparatus is primarily used to clean and texture concrete surfaces in preparation for the application of a new overlay of concrete or other coatings or to texture slick surfaces for skid resistance.

The apparatus functions by centrifugal projection of abrasive particles at very high speed by blast wheels 32 and 32a against the surface to be treated to cause the surface to break off in the form of relatively small particulate material or debris. The apparatus may also be used for cleaning and profiling steel surfaces in preparation for repainting or recoating. The spent abrasive particles and particulate material or debris removed from the surface being treated is recirculated through the apparatus where the particulate debris and dust from the surface are separated from the abrasive particles prior to recirculating the same for further use.

The abrasive particles 41, separated from the surface debris, are withdrawn from hopper 90 past the abrasive metering valve into the center or hub portion 93 of centrifugal blast wheel 32. The high speed rotation of blast wheel 32 causes blades 132 to throw the abrasive particles against the surface 28 being treated. The abrasive particles are typically thrown at a relatively high speed, e.g. 250 feet per second or higher. The abrasive particles 41 are thrown by wheel 32 at an angle to the surface 28 which is determined by the angle of housing portion 29.

The abrasive particles 41 and particulate debris removed from surface 28 rebound into return passage 42 which has a relatively wide entrance portion 43 which narrows or tapers as it curves upward toward the exit end 45. The return passage 42 has an angle relative to the surface 28 being treated which approximates the rebound angle of the abrasive particles 41 and particulate debris removed from surface 28. The very high speed and angle at which the abrasive particles 41 are projected against surface 28 provides sufficient energy for the particles 41 and particulate debris to rebound through return chamber 42 without requiring additional energy.

The apparatus is designed with air passages 36, 103 and 104 which receive air from blower 84 which recirculates the air from which the debris and dust have been separated. This air flow exits at the outlet ends of passages 36, 103 and 104 to sweep the surface being blasted thrown by blades 132 of centrifugal blast wheel 32.

This air is recirculated through the apparatus along with the particles 41. The air blown through passages 36, 103 and 104 air-washes or sweeps surface 28 behind and to the sides of the point of impact of abrasive particles 41 and sweeps the surface to assist in picking up particulate material to form the same into return passage 42. The edge 44 of housing 11 functions as a dust pan and the air sweeping across surface 28 moves the particulate debris into the blast pattern or over the edge 44 and on into return passage 42 where the turbulent effect and force of rebounding abrasive sweeps all other material in the direction of flow. The lower end of housing 11 is reinforced as at 44a to provide a skid plate which bears on surface 28 and also tends to protect the entrance to return passage 42 from being damaged or bent.

The mixture of abrasive particles 41 and particulate debris from surface 28 moves upward through return passage 42 as indicated by the directional arrows. The passage diminishes in cross section as it approaches the discharge end 45. There is some rebounding of abrasive particles and particulate material from side to side but generally these materials follow the curved contour of the return passage 42. The mixture of abrasive particles and particulate debris is ejected through return passage outlet 45 against the series of trays 56. The mixture of particles builds up on the trays as indicated at 58 and provides a means for absorbing the kinetic energy of motion of the abrasive particles 41 and particulate debris.

After a layer 58 of particles has built up on trays 56, the mixture of particles begins to spill over and falls through coarse screen 53 into the intermediate hopper 60. The air which is being returned through passage 42 and the finest particles of particulate debris are removed overhead into chamber 52 through the fire screen 51. The mixture of air and fine particles or dust is removed through cylindrical separator 73 where the dust particles pass out as a stream 77 through the skimmer slot 76 and the clean air is circulated by blower 74 through passage 80 and introduced as a cross flow through passage 66 through the stream 65 of abrasive particles 41 and particulate debris falling past the gate or closure 62.

This circulation of air across the falling mixture of particles blows out the coarser particles of particulate debris and directs them into the collector section 48 of the housing. The heavier particles of debris settle out without further treatment while the finer particles are separated in cylindrical separator 95. The abrasive particles 41 which fall past the cross flow of air and are separated from the particulate debris are collected then in hopper 90 for recirculation through the apparatus. The air from cylindrical separator 95 is directed by blower 84 to passages 36, 103 and 104 to provide the previously described air-washing or sweeping action underneath the apparatus for assisting in removing the particulate debris released by impact of the abrasive on the surface 28 being treated.

The apparatus described and shown herein may be made in a variety of sizes ranging from small, relatively narrow units ranging from about 9 inches up to 4 feet or more in width, and in larger sizes up to about 13 feet in width or larger for large highway applications.

The apparatus is illustrated as being powered by a motor means which is preferably a hydraulic motor or pump powered by an electric or internal combustion motor, etc. Motor 110 drives a hydraulic motor or pump 109 which powers hydraulic motors 26 and 26a and is supplied with hydraulic fluid from hydraulic reservoir (not shown). The apparatus can obviously be powered by other types of motor means, including hydraulic motors, internal combustion engines, electric motors, etc. Where a different motor means is utilized it is obvious that another source of power will be provided for operating motors 26 and 26a and/or blower motors 75 and 92.

The apparatus is self-propelled using endless treads or tracks 25 and 25a, but other types of self-propulsion, including wheels or the like may be used. The apparatus could also be constructed on a moveable skid and towed by a suitable tractor. If endless tracks or treads are not used, then additional rubber or plastic seals corresponding to seals 105, 106, 107 and 108 must be provided at the sides of the apparatus to confine the abrasive underneath the apparatus during operation.

With this apparatus has been described with special emphasis upon a single preferred embodiment it should be understood that within the scope of the appended claims the invention may be practiced otherwise than as specifically described herein.

We claim:

1. An apparatus for treating surfaces by abrasive blasting comprising
    a movable housing open at the bottom and including supporting means for movement over a surface to be treated,
    a reservoir for abrasive particles,
    a wheel positioned in said housing, in communication with said reservoir, having a plurality of blades operable upon rotation to throw said abrasive particles at high velocity
    means for rotating said wheel at high speed,
    a portion of said housing supporting said wheel at an angle to said surface whereby rotation of said wheel throws abrasive particles at high velocity at an angle to said surface,
    said housing having a return passage for said abrasive particles and particulate debris broken from said surface by impingement of said particles thereon extending to convey said particles and broken material toward said reservoir,
    at least one horizontally oriented, downwardly inclined tray positioned in linear alignment with the end of said return passage and laterally spaced from said reservoir to receive abrasive particles and particulate debris from said return passage and positioned to overflow laterally into said reservoir,
    said tray being effective to collect said abrasive particles and to absorb their kinetic energy to prevent excessive rebounding of particles and permitting said particles subsequently to continue on to said reservoir, and separator means for separating particulate debris from said abrasive particles oveflowing from said tray prior to returning the same to said reservoir.

2. An apparatus according to claim 1 in which there are included a plurality of said horizontally oriented, downwardly inclined trays, vertically spaced from each other and positioned at the end of said return passage to receive abrasive particles and particulate debris therefrom.

3. An apparatus according to claim 1 in which said separator means comprises means forming a hopper collecting abrasive particles and particulate debris overflowing from said tray and allowing the same to fall in a sheet or thin stream toward said reservoir, and means directing a flow of air in a path intersecting said sheet or stream at a predetermined velocity sufficient to separate particulate debris therefrom while allowing said abrasive particles to fall into said reservoir.

4. An apparatus according to claim 3 in which said separator means includes an adjustable skimmer plate extending angularly into the path of falling abrasive particles and particulate debris adjacent to said intersecting flow of air, said plate being operable upon adjustment to define a divider over which said particulate debris is blown and behind which said abrasive particles fall into said reservoir.

5. An apparatus according to claim 3 including dust collector means connected to said separator means to remove particulate debris from said air flow after passing therethrough.

6. An apparatus according to claim 3 including means to remove air and fine particulate debris overhead adjacent to said collection and energy absorption means and to circulate the same to said separator air flow directing means.

7. An apparatus according to claim 6 including dust separator and collector means for removing said fine particulate debris from said air flow prior to circulating the same to said first named separator means.

8. An apparatus according to claim 7 in which said dust separator and collector means comprises a centrifugal separator and blower associated therewith for circulation of said air.

9. An apparatus according to claim 6 including a fine screen positioned overhead through which said air is withdrawn to separate coarser particulate debris therefrom.

10. An apparatus according to claim 1 in which said housing includes a passage for directing a flow of air beneath said apparatus to sweep particulate debris from said surface into said return passage.

11. An apparatus according to claim 5 in which said housing includes a passage for directing a flow of air from said dust collector means to the area beneath said apparatus to keep particulate debris from said surface into said return passage.

12. An apparatus according to claim 10 in which said housing has an edge portion of the entrance to said return passage engaging said surface to direct the flow of said air from said parallel passage and the swept particulate debris into said return passage.

13. An apparatus according to claim 5 in which said housing comprises an abrasive recovery section and a dust collector section having a dust storage hopper, and said dust collector means comprises a centrifugal dust collector discharging separated dust to said hopper.

14. An apparatus according to claim 13 in which said dust collector means includes a blower connected thereto and operable to supply air separated from dust to an area beneath said apparatus for sweeping particulate debris into said return passage.

15. An apparatus according to claim 14 in which said separator means includes an adjustable skimmer plate extending angularly into the path of falling abrasive particles and particulate debris adjacent to said intersecting flow of air, said plate being operable upon adjustment to define a divider over which said particulate debris is blown and behind which said abrasive particles fall into said reservoir.

16. An apparatus according to claim 1 in which said supporting means comprises means for moving said housing over a surface to be treated and supporting one end firmly on said surface and the other end resiliently to permit said housing to follow irregularities in the surface.

17. An apparatus according to claim 16 in which said supporting means includes motor means for moving the same.

18. An apparatus according to claim 16 in which said supporting means comprises supporting means for said housing with a pair of endless supporting treads and motor means for driving the same, said treads additionally functioning to seal the sides of said apparatus at the bottom thereof to confine abrasive particles therebetween.

19. An apparatus according to claim 18 including sealing flaps on said housing at the front and rear ends of said bottom opening between said treads and engaging said surface to confine said abrasive particles therebetween.

20. An apparatus according to claim 16 in which said mobile supporting means comprises a pair of endless supporting treads and reversible and controllable motor means for moving the same to move said housing over a surface to be treated, and said supporting means including means supporting one end of said housing firmly on said surface and the other end of said housing resiliently to permit said housing to follow irregularities in the surface.

21. An apparatus according to claim 20 in which said resilient supporting means comprises a pneumatic support connected between said supporting means and said other end of said housing.

* * * * *